(12) United States Patent
Noguchi et al.

(10) Patent No.: US 7,141,087 B2
(45) Date of Patent: Nov. 28, 2006

(54) HONEYCOMB CERAMICS FILTER

(75) Inventors: Yasushi Noguchi, Nagoya (JP); Hideaki Nishi, Toyoake (JP); Hiroyuki Suenobu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 342 days.

(21) Appl. No.: 10/469,155

(22) PCT Filed: Mar. 27, 2002

(86) PCT No.: PCT/JP02/02972

§ 371 (c)(1),
(2), (4) Date: Aug. 27, 2003

(87) PCT Pub. No.: WO02/081058

PCT Pub. Date: Oct. 17, 2002

(65) Prior Publication Data

US 2004/0112024 A1    Jun. 17, 2004

(30) Foreign Application Priority Data

Apr. 4, 2001   (JP) .............................. 2001-106395

(51) Int. Cl.
*B01D 46/00* (2006.01)
*F01N 3/021* (2006.01)

(52) U.S. Cl. .................. 55/523; 55/282.2; 55/282.3; 55/385.3; 55/523; 55/DIG. 10; 55/DIG. 30; 60/311

(58) Field of Classification Search ............... 55/282.2, 55/282.3, 385.3, 523, DIG. 10, DIG. 30; 60/311; 501/9, 119, 120; 264/628, 630, 264/631, DIG. 48; 428/116, 117, 118
See application file for complete search history.

(56) References Cited

U.S. PATENT DOCUMENTS

| | | | | |
|---|---|---|---|---|
| 4,297,140 A |  | 10/1981 | Paisley | |
| 4,632,683 A | * | 12/1986 | Fukutani et al. | 55/523 |
| 5,198,006 A | * | 3/1993 | Mimori et al. | 55/523 |
| 5,258,150 A | * | 11/1993 | Merkel et al. | 264/631 |
| 5,549,725 A |  | 8/1996 | Kasai et al. | |
| 5,634,952 A | * | 6/1997 | Kasai et al. | 55/523 |
| 5,846,276 A |  | 12/1998 | Nagai et al. | |
| 5,853,444 A |  | 12/1998 | Maier et al. | |
| 6,048,490 A |  | 4/2000 | Cornelius et al. | |
| 6,087,281 A | * | 7/2000 | Merkel | 501/9 |
| 6,261,982 B1 | * | 7/2001 | Takahashi et al. | 55/523 |
| 6,506,336 B1 | * | 1/2003 | Beall et al. | 264/630 |
| 6,541,407 B1 | * | 4/2003 | Beall et al. | 55/523 |
| 6,800,108 B1 | * | 10/2004 | Noda | 55/523 |
| 6,818,580 B1 | * | 11/2004 | Kumazawa et al. | 55/523 |

FOREIGN PATENT DOCUMENTS

| EP | 0 545 008 A1 | | 6/1993 |
|---|---|---|---|
| EP | 1 029 836 A2 | | 8/2000 |
| JP | 6-241018 | * | 8/1994 |
| JP | A 6-241018 | | 8/1994 |
| JP | A 6-327921 | | 11/1994 |
| JP | A 9-71466 | | 3/1997 |
| JP | A 9-202671 | | 8/1997 |

* cited by examiner

Primary Examiner—Jason M. Greene
(74) Attorney, Agent, or Firm—Oliff & Berridge PLC

(57) ABSTRACT

There is disclosed a honeycomb ceramics filter, wherein an average pore diameter X (μm) and partition wall thickness W (μm) of the filter satisfy a relation of $10 \geq W/X$. According to this filter, while a predetermined trapping efficiency is maintained, a pressure loss can be prevented from increasing to be not less than a predetermined pressure loss even with use for a long period.

9 Claims, No Drawings

HONEYCOMB CERAMICS FILTER

TECHNICAL FIELD

The present invention relates to a honeycomb ceramics filter which has a honeycomb shape. The present invention further particularly relates to a honeycomb ceramics filter in which trapping efficiency of particulates is sacrificed to some extent, but an ash content generated by oil combustion of a diesel engine is extracted from pores so as to prevent a pressure loss from increasing to be not less than a predetermined loss even with a long-period use.

BACKGROUND ART

In recent years, a porous honeycomb ceramics filter has been used as an apparatus for removing particulates in exhaust gas, including a structure in which a plurality of through holes opened in end surfaces on exhaust gas inflow and outflow sides are alternately closed in the opposite end surfaces. The exhaust gas which has flown in from the end surface on the exhaust gas inflow side is forcibly passed through partition walls (including a plurality of fine pores) among the respective through holes to trap/remove the particulates in the exhaust gas.

For the ceramics filter, a pore diameter of the fine pore formed in the partition wall between the respective through holes is determined by a relation with a particulate diameter of the particulate in the exhaust gas, and capabilities such as trapping efficiency and pressure loss differ with a degree of the pore diameter. In view of this, development has heretofore been advanced so as to obtain the ceramics filter having a high trapping efficiency of particulates (such as soot).

However, for the filter having the raised trapping efficiency, since the pore diameter of the filter is small, there is a problem that an ash content generated by oil combustion of a diesel engine is accumulated in the pores of the filter and the pressure loss is raised to be not less than a predetermined loss by the use for a long period. For the filter having a small pore diameter, the pressure loss is high in sampling the particulates (such as the soot), and there has been a demand for reduction of the loss.

Additionally, in recent years, by improvement of the diesel engine, the particulates such as the soot generated from the engine have been reduced by a considerable amount than before. Then, as a result of the present inventor's intensive studies, in order to clear a regulated value of a future exhaust gas standard, it is not necessary to achieve an extremely high trapping efficiency. Conversely, it has been found that in order to prevent a rise of the pressure loss caused by the accumulation of the ash content into the pores, it is important to increase the pore diameter to such an extent that the exhaust gas can pass through the partition wall, and the present invention has been attained.

Therefore, an object of the present invention is to provide a honeycomb ceramics filter in which a predetermined trapping efficiency is maintained, an ash content generated by oil combustion of a diesel engine is extracted from pores, and pressure loss is accordingly prevented from increasing to be not less than a predetermined loss even with long-period use.

DISCLOSURE OF THE INVENTION

That is, according to the present invention, there is provided a honeycomb ceramics filter, characterized in that an average pore diameter X (µm) and partition wall thickness W (µm) of the filter satisfy the following relation:

$$10 \geq W/X.$$

In the ceramics filter of the present invention, the average pore diameter X (µm) and partition wall thickness W (µm) of the filter preferably satisfy a relation of $7 \geq W/X \geq 3$. The average pore diameter X (µm) and partition wall thickness W (µm) of the filter more preferably satisfy a relation of $5 \geq W/X \geq 3$.

Moreover, in the ceramics filter of the present invention, a porosity is preferably 55 to 75%, and a ceramic preferably contains cordierite and/or silicon carbide as a major component. Furthermore, in the ceramics filter of the present invention, a thermal expansion coefficient at 40 to 800° C. is preferably $1.0 \times 10^{-6}/°$ C. or less. The filter of the present invention preferably has a honeycomb shape whose partition wall thickness W is 350 µm or less and whose cell density is 250 cells/in$^2$ or more.

BEST MODE FOR CARRYING OUT THE INVENTION

Embodiments of the present invention will concretely be described hereinafter, but the present invention is not limited to these embodiments.

In the present invention, a pore diameter and partition wall thickness are controlled so that an average pore diameter X (µm) and partition wall thickness W (µm) of the filter satisfy a relation of $10 \geq W/X$ to constitute a honeycomb ceramics filter.

As described above, the present inventor has found that it is important to increase a pore diameter to such an extent that exhaust gas can pass through partition walls in order to prevent a rise of pressure loss caused by accumulation of an ash content into pores. Concretely, the present inventor has intensively studied a relation between the pore diameter and the partition wall thickness. When the pore diameter is increased to be not less than a predetermined diameter with respect to the partition wall thickness of a honeycomb structure, trapping efficiency of particulates such as soot drops to some extent, but the pressure loss at the time of sampling the particulates can be reduced. Additionally, the ash content accumulated in the pores formed inside partition walls can be extracted from the pores. As a result, it has been found that it is possible to obtain a honeycomb ceramics filter which can stably function for a long period without increasing the pressure loss to be not less than the predetermined loss even with the long-period use.

In the present invention, when a relation W/X between the average pore diameter X (µm) and partition wall thickness W (µm) of the filter is larger than 10, the exhaust gas does not easily pass through the partition walls, and the ash content accumulated in the pores cannot be extracted from the pores.

In the present invention, the relation between the average pore diameter X (µm) and the partition wall thickness W (µm) is preferably $7 \geq W/X \geq 3$ in order to achieve the above-described pores, and more preferably $5 \geq W/X \geq 3$.

Moreover, in the honeycomb ceramics filter of the present invention, in order to achieve the above-described object of the present invention, the average pore diameter X is usually 20 to 70 µm, more preferably 30 to 70 µm. The partition wall thickness W is preferably 350 µm or less, and more preferably in a range of 200 to 300 µm.

Major components of the ceramics filter of the present invention are not especially limited, and any type of ceramic can be used, but cordierite and/or silicon carbide are preferably the major components. Cordierite may be oriented, non-oriented, α-crystalline, or β-crystalline. Silicon carbide may be either α-crystalline or β-crystalline.

Moreover, other components may also be contained such as mullite, zirconium, aluminum titanate, clay bond silicon carbide, zirconia, spinel, indialite, sapphirine, corundum, and titania.

The honeycomb filter of the present invention has a porosity of preferably 55 to 75%, more preferably 60 to 70% in terms of the reduction of the pressure loss and the trapping efficiency. In terms of enhancement of thermal shock resistance at the time of the use at a high temperature, a thermal expansion coefficient at 40 to 800° C. is preferably $1.0 \times 10^{-6}$/° C. or less, more preferably $0.8 \times 10^{-6}$/° C. or less.

Moreover, the ceramics filter of the present invention is usually of a honeycomb type including a structure in which a plurality of through holes opened in end surfaces on exhaust gas inflow and outflow sides are alternately closed in the opposite end surfaces. However, the shape of the honeycomb filter is not especially limited, and any of shapes may be used such as a column whose end surface has a perfect circular or elliptic shape, a prism whose end surface has a triangular, quadrangular, or otherwise polygonal shape, and a column or prism whose side surface has a curved V-shape. Moreover, the shape of the through hole is not especially limited, and the section may have any of the shapes such as the polygonal shapes including the quadrangular and octagonal shapes, the perfect circular shape, and the elliptic shape. The filter has a cell density in a range of preferably 250 cells/in$^2$ or more, more preferably 300 to 400 cells/in$^2$ in terms of the sampling capability of the exhaust gas.

The honeycomb ceramics filter of the present invention can be-manufactured by the following methods.

First, when a cordierite material is used as a starting material of the filter, and when the cordierite material is blended with components so as to obtain a theoretical composition of a cordierite crystal, it is necessary to blend silica ($SiO_2$) source components, magnesia (MgO) source components such as kaolin and talc, alumina ($Al_2O_3$) source components such as aluminum oxide and aluminum hydroxide, and the like.

For the alumina ($Al_2O_3$) source components, the material containing either one or both of aluminum oxide and aluminum hydroxide is preferable because of a small amount of impurities. Above all, it is preferable to contain aluminum hydroxide.

Moreover, for the alumina ($Al_2O_3$) source components, the cordierite material preferably contains 15 to 45% by mass of aluminum hydroxide, or 0 to 20% by mass of aluminum oxide.

Examples of the magnesia (MgO) source components include talc and magnesite. Above all, talc is preferable. The cordierite material preferably contains 37 to 40% by mass of talc, and a particle diameter of talc is preferably 5 to 40 μm, more preferably 10 to 30 μm in order to reduce the thermal expansion coefficient.

Moreover, the magnesia (MgO) source components such as talc for use in the present invention may contain $Fe_2O_3$, CaO, $Na_2O$, $K_2O$, and the like which are impurities. Additionally, the content of $Fe_2O_3$ is preferably 0.1 to 2.5% by mass in the magnesia (MgO) source component. With the content in this range, the thermal expansion coefficient can be reduced, and a high porosity can also be obtained.

Furthermore, the contents of CaO, $Na_2O$, $K_2O$ are preferably set to 0.35% by mass or less in total in the magnesia (MgO) source component so as to lower the thermal expansion coefficient.

It is to be noted that in the present invention, silicon carbide can be the major component as the starting material of the filter. The case in which silicon carbide is the major component includes both the cases in which silicon carbide (SiC) is the major component and in which silicon carbide (SiC) and metal silicon (Si) are the major components.

When the filter of the present invention is manufactured, the start material containing the cordierite material and/or silicon carbide as the major component may be blended with various additives if necessary. Examples of the additives include a foamed resin, a binder, a dispersant for promoting dispersion into a medium solution, and a hole making material for forming pores.

Examples of the foamed resin include acrylic microcapsule, and the like. Examples of the binder include hydroxypropyl methyl cellulose, methyl cellulose, hydroxyl ethyl cellulose, carboxyl methyl cellulose, polyvinyl alcohol, and the like. Examples of the dispersant include ethylene glycol, dextrin, fatty acid soap, polyalcohol, and the like. Examples of the hole making agent include graphite, flour, starch, phenol resin, polymethyl methacrylate, polyethylene, polyethylene terephthalate, and the like.

These additives can be used alone or as a combination of two or more thereof in accordance with purposes.

In the present invention, the above-described starting materials can be used to manufacture the honeycomb ceramics filter in the following manufacturing steps.

First, 3 to 5 parts by weight of the binder, 3 to 40 parts by weight of the hole making agent, 0.5 to 2 parts by weight of the dispersant, and 10 to 40 parts by weight of water are cast into 100 parts by weight of the above-described starting material, kneaded, and plasticized.

Subsequently, the plastic material can be molded by an extrusion molding method, an injection molding method, a press molding method, a method of molding a ceramic material into a columnar shape and thereafter forming through holes, and the like. Above all, the extrusion molding method is preferably carried out in that continuous molding is easy and, for example, a cordierite crystal can be oriented to obtain a low thermal expansion property.

Next, the molded material can be dried by hot-air drying, microwave drying, dielectric drying, reduced-pressure drying, vacuum drying, freeze drying, and the like. Above all, a drying step in which the hot-air drying is combined with the microwave drying or the dielectric drying is preferably carried out in that the whole material can quickly and uniformly be dried.

Finally, to calcine the dried/molded material, depending on the size of the dried/molded material, usually with the cordierite material, the material is preferably calcined under the atmosphere at temperature of 1410 to 1440° C. for three to seven hours. With the material containing silicon carbide which is the major component, the material is calcined under a non-oxidizing atmosphere such as $N_2$ and Ar in order to prevent-oxidation of SiC. When SiC is bonded by silicon nitride, the calcining temperature is a temperature at which a silicon nitride powder is softened, and the calcining is preferably carried out at a temperature of 1550 to 2000° C. When SiC particles are bonded to one another by a recrystallization method, it is necessary to calcine the material at a temperature of at least 1800° C. or more. Furthermore, when SiC and Si are major components, the calcining is preferably carried out under the non-oxidizing atmosphere such as $N_2$ and Ar at a temperature of 1400 to 1800° C. It is to be noted that the drying and calcining steps may also continuously be carried out.

The present invention will more concretely be described by means of examples hereinafter, but the present invention is not limited to these examples.

1. Evaluation Method

The honeycomb ceramics filters obtained in Examples 1 to 13 and Comparative Examples 1 to 5 described later were evaluated by the following methods.

(1) Average Pore Diameter

The average pore diameter was measured by a mercury press-in porosimeter manufactured by Micromeritics Co.

(2) Porosity

A true specific gravity of cordierite was set to 2.52 g/cm$^3$, and the porosity was calculated from a total pore volume. The true specific gravity of SiC was set to 3.05 g/cm$^3$.

(3) Trapping Efficiency

Exhaust gas from which soot was generated by a soot generator was allowed to flow into a filter having a size: φ144 mm×152 mm (length) and having an average pore diameter X, partition wall thickness W, porosity, cell density, and thermal expansion coefficient shown in Table 2 for two minutes. The soot included in the exhaust gas passed through the filter was trapd with filter paper, and a weight ($W_1$) of the soot was measured. At the same time, the exhaust gas from which the soot was generated was trapd with the filter paper without being passed through the filter, and a weight ($W_2$) of the soot was measured. Subsequently, the obtained weights ($W_1$) and ($W_2$) were assigned to the following equation to obtain the trapping efficiency:

$$(W_2-W_1)/(W_2)\times100.$$

(4) Soot Sampling Pressure Loss Evaluation

The honeycomb ceramics filter having the size: φ144 mm×152 mm (length) was used, front and back of the honeycomb filter were pressed with a ring having an inner diameter of φ130 mm, and measurement was carried out substantially in the inner diameter of φ130 mm. The soot was generated by the soot generator, and 10 g of soot was trapd by the honeycomb filter. In this state, 2.27 Nm$^3$/min of air was passed, and a pressure difference before/after the filter was measured.

EXAMPLES 1 TO 12

Main materials and hole making materials were mixed to prepare various cordierite materials with average particle diameters and blend ratios shown in Table 1.

Subsequently, with respect to 100 g of each of these various cordierite materials, 4 g of hydroxypropyl methyl cellulose, 0.5 g of lauric acid potash soap, and 30 g of water were cast, kneaded, and plasticized. This plastic material was formed into a cylindrical mound of earth with a vacuum earth kneader, cast into an extrusion molding machine, and molded in a honeycomb shape.

Subsequently, various obtained molded materials were dielectrically dried, and thereafter absolutely dried by the hot-air drying, and opposite end surfaces were cut into predetermined dimensions.

Subsequently, the through holes in the honeycomb-shaped dried material were alternately closed in the opposite end surfaces in which the through holes were opened with a flurry formed of the cordierite material having the similar composition.

Finally, after the calcining at 1420° C. for four hours, according to Examples 1 to 12 and Comparative Examples 1 to 5, the honeycomb ceramics filter having the size: φ144 mm×152 mm (length) was obtained.

EXAMPLE 13

The main materials (SiC and Si) and hole making materials shown in Table 1 were used to carry out the drying and hole closing in the same method as that of Examples 1 to 12. The materials were calcined below 400° C. in an ambient-pressure oxidizing atmosphere, at 400° C. or more in an ambient-pressure argon atmosphere, and at a maximum temperature of 1450° C. for one hour to obtain the honeycomb ceramics filter having the size: φ144 mm×152 mm (length).

Evaluation results of Examples 1 to 13 and Comparative Examples 1 to 5 are shown altogether in Table 2.

TABLE 1

| No. | Main material | | | | | | Hole making material | |
|---|---|---|---|---|---|---|---|---|
| | Talc (% by mass) | Kaolin (% by mass) | Quartz (% by mass) | Molten silica (% by mass) | Aluminum oxide (% by mass) | Aluminum hydroxide (% by mass) | Graphite (% by mass) | Foamed resin (% by mass) |
| Example 1 | 40 (15 μm) | 19 (10 μm) | 12 (39 μm) | 0 | 14 (7 μm) | 15 (2 μm) | 15 (51 μm) | 2 (52 μm) |
| Example 2 | 40 (15 μm) | 19 (10 μm) | 12 (39 μm) | 0 | 14 (7 μm) | 15 (2 μm) | 15 (51 μm) | 2 (52 μm) |
| Example 3 | 40 (15 μm) | 19 (10 μm) | 12 (39 μm) | 0 | 14 (7 μm) | 15 (2 μm) | 15 (51 μm) | 2 (52 μm) |
| Example 4 | 40 (15 μm) | 0 | 21 (10 μm) | 0 | 16 (7 μm) | 23 (3 μm) | 20 (29 μm) | 4 (35 μm) |
| Example 5 | 40 (15 μm) | 0 | 21 (10 μm) | 0 | 16 (7 μm) | 23 (3 μm) | 20 (29 μm) | 4 (35 μm) |
| Example 6 | 40 (15 μm) | 0 | 21 (10 μm) | 0 | 16 (7 μm) | 23 (3 μm) | 20 (29 μm) | 4 (35 μm) |
| Example 7 | 40 (15 μm) | 0 | 21 (10 μm) | 0 | 16 (7 μm) | 23 (3 μm) | 20 (29 μm) | 4 (35 μm) |
| Example 8 | 40 (7 μm) | 0 | 0 | 21 (78 μm) | 16 (5 μm) | 23 (1.5 μm) | 20 (29 μm) | 4 (64 μm) |
| Example 9 | 40 (20 μm) | 0 | 21 (89 μm) | 0 | 16 (10 μm) | 23 (1.5 μm) | 0 | 3 (64 μm) |
| Example 10 | 40 (20 μm) | 0 | 21 (89 μm) | 0 | 16 (10 μm) | 23 (1.5 μm) | 0 | 3 (64 μm) |
| Example 11 | 40 (20 μm) | 0 | 0 | 21 (54 μm) | 16 (10 μm) | 23 (2 μm) | 0 | 2 (52 μm) |
| Example 12 | 40 (15 μm) | 19 (10 μm) | 0 | 12 (32 μm) | 14 (7 μm) | 15 (2 μm) | 20 (29 μm) | 4 (35 μm) |
| Example 13 | SiC (35 μm): 80% by mass, Si (6 μm): 20% by mass | | | | | | 0 | 3 (52 μm) |
| Comparative Example 1 | 40 (15 μm) | 0 | 21 (10 μm) | 0 | 16 (7 μm) | 23 (3 μm) | 20 (29 μm) | 4 (35 μm) |
| Comparative Example 2 | 40 (15 μm) | 19 (10 μm) | 12 (10 μm) | 0 | 14 (7 μm) | 15 (2 μm) | 15 (51 μm) | 3 (52 μm) |
| Comparative Example 3 | 40 (15 μm) | 19 (10 μm) | 12 (10 μm) | 0 | 14 (7 μm) | 15 (2 μm) | 15 (51 μm) | 3 (52 μm) |
| Comparative Example 4 | 40 (15 μm) | 19 (10 μm) | 12 (10 μm) | 0 | 14 (7 μm) | 15 (2 μm) | 15 (51 μm) | 3 (52 μm) |
| Comparative Example 5 | 40 (15 μm) | 19 (10 μm) | 12 (10 μm) | 0 | 14 (7 μm) | 15 (2 μm) | 15 (51 μm) | 3 (52 μm) |

Numerals within parentheses in the table denote the average particle diameters of the materials.

TABLE 2

| No. | Partition wall thickness W (μm) | Cell density (/in²) | Porosity (%) | Average pore diameter X (μm) | W/X | Thermal expansion coefficient (x10⁻⁶/° C.) | Soot sampling pressure loss (KPa) | Trapping efficiency (%) |
|---|---|---|---|---|---|---|---|---|
| Example 1 | 300 | 300 | 59 | 32 | 9.4 | 0.6 | 9.4 | 86 |
| Example 2 | 250 | 300 | 59 | 32 | 7.8 | 0.6 | 8.6 | 71 |
| Example 3 | 200 | 300 | 59 | 32 | 6.3 | 0.6 | 7.3 | 59 |
| Example 4 | 200 | 350 | 70 | 24 | 8.3 | 0.7 | 5.2 | 79 |
| Example 5 | 150 | 350 | 70 | 24 | 6.3 | 0.7 | 4.9 | 58 |
| Example 6 | 150 | 400 | 70 | 24 | 6.3 | 0.7 | 4.2 | 52 |
| Example 7 | 100 | 400 | 70 | 24 | 4.2 | 0.7 | 3.5 | 45 |
| Example 8 | 300 | 300 | 75 | 45 | 6.7 | 1.0 | 7.6 | 63 |
| Example 9 | 300 | 300 | 61 | 61 | 4.9 | 1.0 | 9.3 | 48 |
| Example 10 | 350 | 300 | 61 | 61 | 5.7 | 1.0 | 10.3 | 50 |
| Example 11 | 200 | 300 | 55 | 45 | 4.4 | 0.5 | 7.9 | 45 |
| Example 12 | 100 | 400 | 68 | 32 | 3.1 | 0.8 | 3.7 | 42 |
| Example 13 | 300 | 250 | 58 | 31 | 9.7 | 4.1 | 7.3 | 89 |
| Comparative Example 1 | 250 | 300 | 70 | 24 | 10.4 | 0.7 | 7.1 | 91 |
| Comparative Example 2 | 200 | 300 | 68 | 15 | 13.3 | 0.8 | 6.8 | 94 |
| Comparative Example 3 | 300 | 300 | 68 | 15 | 20.0 | 0.8 | 8.6 | 96 |
| Comparative Example 4 | 400 | 300 | 68 | 15 | 26.7 | 0.6 | 10.3 | 97 |
| Comparative Example 5 | 300 | 200 | 68 | 15 | 20.0 | 0.6 | 10.7 | 95 |

INDUSTRIAL APPLICABILITY

As described above, since a value obtained by dividing a partition wall thickness by an average pore diameter has correlation with a trapping efficiency, according to the present invention, the value obtained by dividing the partition wall thickness by the average pore diameter can be controlled to freely control the trapping efficiency. Since the trapping efficiency of soot is assumed to have correlation with that of an ash content, according to the present invention, there can be provided a honeycomb ceramics filter in which a predetermined trapping efficiency is maintained and a pressure loss by accumulation of the ash content is prevented from increasing to be not less than a predetermined pressure loss even with use for a long period.

The invention claimed is:

1. A honeycomb ceramics filter, wherein the honeycomb ceramics filter contains at least one of cordierite and silicon carbide as a major component, has a thermal expansion coefficient at 40 to 800° C. that is $0.8 \times 10^{-6}$/° C. or less, and has an average pore diameter X (μm) of the filter that is 20 to 70 μm and partition wall thickness W (μm) of the filter that is 350 μm or less and satisfies the following relation:

$$10 \geq W/X.$$

2. The honeycomb ceramics filter according to claim 1, wherein the average pore diameter X (μm) and partition wall thickness W (μm) of the filter satisfy the following relation:

$$7 \geq W/X \geq 3.$$

3. The honeycomb ceramics filter according to claim 1, wherein the average pore diameter X (μm) and partition wall thickness W (μm) of the filter satisfy the following relation:

$$5 \geq W/X \geq 3.$$

4. The honeycomb ceramics filter according to claim 1, wherein a porosity is 55 to 75%.

5. The honeycomb ceramics filter according to claim 2, wherein a porosity is 55 to 75%.

6. The honeycomb ceramics filter according to claim 3, wherein a porosity is 55 to 75%.

7. The honeycomb ceramics filter according to claim 1, wherein a cell density is 300 cells/in² or more and not greater than 400 cells/in².

8. The honeycomb ceramics filter according to claim 4, wherein a cell density is 300 cells/in² or more and not greater than 400 cells/in².

9. The honeycomb ceramics filter according to claim 1, wherein the partition wall thickness W (μm) is within the range of 200 μm to 350 μm.

* * * * *